(12) United States Patent
Bengtsson

(10) Patent No.: US 12,117,039 B2
(45) Date of Patent: Oct. 15, 2024

(54) CONNECTOR AND SYSTEM FOR INTERCONNECTING TUBULAR PROFILES

(71) Applicant: Troax AB, Hillerstorp (SE)

(72) Inventor: Staffan Bengtsson, Gnosjö (SE)

(73) Assignee: TROAX AB, Hillerstorp (SE)

( * ) Notice: Subject to any disclaimer, the term of this patent is extended or adjusted under 35 U.S.C. 154(b) by 441 days.

(21) Appl. No.: 17/642,467

(22) PCT Filed: Nov. 9, 2020

(86) PCT No.: PCT/EP2020/081496
§ 371 (c)(1),
(2) Date: Mar. 11, 2022

(87) PCT Pub. No.: WO2021/099164
PCT Pub. Date: May 27, 2021

(65) Prior Publication Data
US 2022/0307533 A1      Sep. 29, 2022

(30) Foreign Application Priority Data

Nov. 22, 2019  (EP) .................................. 19210987

(51) Int. Cl.
*F16B 7/04*       (2006.01)
(52) U.S. Cl.
CPC ......... *F16B 7/0413* (2013.01); *Y10T 403/557* (2015.01)
(58) Field of Classification Search
CPC ............................ F16B 7/0413; Y10T 403/557
See application file for complete search history.

(56) References Cited

U.S. PATENT DOCUMENTS 3,484,830 A * 12/1969 Wagner ................. F16B 7/0413
                                                                  285/397
3,547,475 A    12/1970 Gingher
(Continued)

FOREIGN PATENT DOCUMENTS

CN    108468685 A    8/2018
CN    108468686 A    8/2018
(Continued)

OTHER PUBLICATIONS

International Search Report and Written Opinion from corresponding International Application No. PCT/EP2020/081496, mailed on Jan. 29, 2021, 12 pages.

*Primary Examiner* — Michael P Ferguson
(74) *Attorney, Agent, or Firm* — Tucker Ellis LLP

(57) ABSTRACT

A connector (1) and a system for interconnecting tubular profiles. The connector comprises first and second connector ends (2, 3), an intermediate part (4) arranged between the connector ends (2, 3). A first engaging element (5) is movably arranged relative a second engaging element (6), between a non-expanded state and an expanded state of the connector (1). An expansion bracket (7) comprises a distal part (8) arranged at a first distance (a) from the intermediate part (4) and at least one proximal part (9) arranged at the intermediate part (4). A tensioner (10) is arranged at the intermediate part (4) and substantially extending in a transverse second axis direction (Y) relative a first longitudinal axis direction (X) of the connector (1). The tensioner (10) is engaged with the proximal part (9) and is arranged to move the proximal part (9) in the second axis direction (Y) so that the expansion bracket (7) pivots, whereby the distal part (8) gets an increased extension along the second axis direction (Y) thereby pressing the first and second engaging elements (5, 6) away from each other.

7 Claims, 3 Drawing Sheets

(section A-A)

(56) References Cited

U.S. PATENT DOCUMENTS

| | | | |
|---|---|---|---|
| 4,570,408 A | * | 2/1986 | Frascaroli ............. E04B 1/5831 |
| | | | 52/843 |
| 5,464,299 A | * | 11/1995 | Scharer ................ F16B 7/0446 |
| | | | 403/264 |
| 5,642,957 A | | 7/1997 | Lange |

FOREIGN PATENT DOCUMENTS

| DE | 8905325 U1 | 8/1989 | |
|---|---|---|---|
| FR | 2 721 092 | * 12/1995 | ............ F16B 7/0413 |

\* cited by examiner

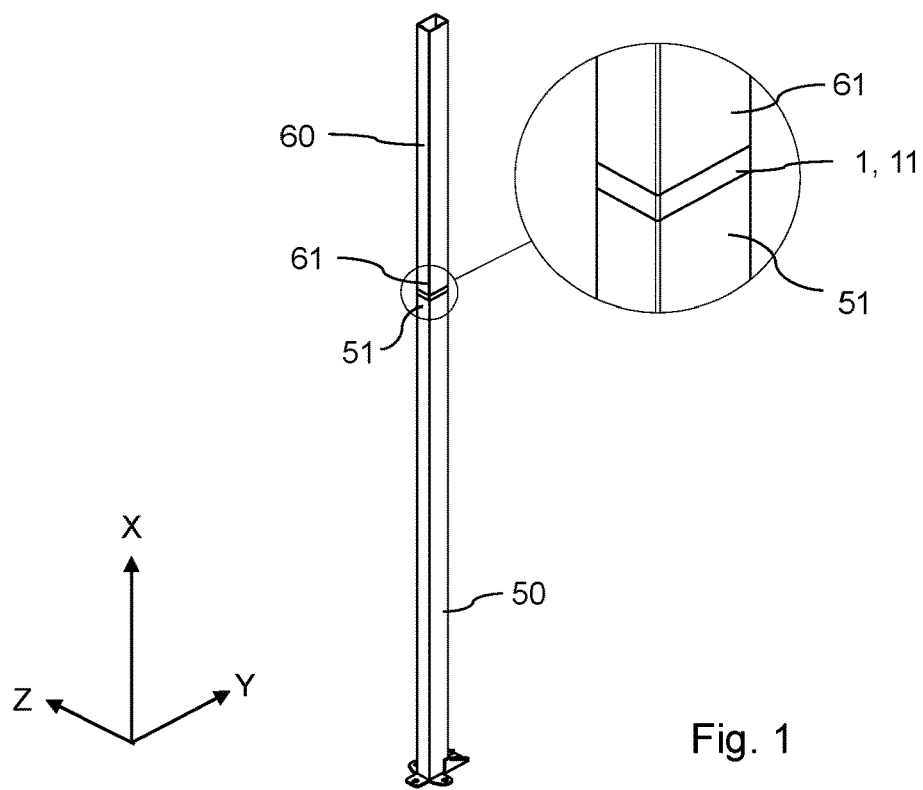
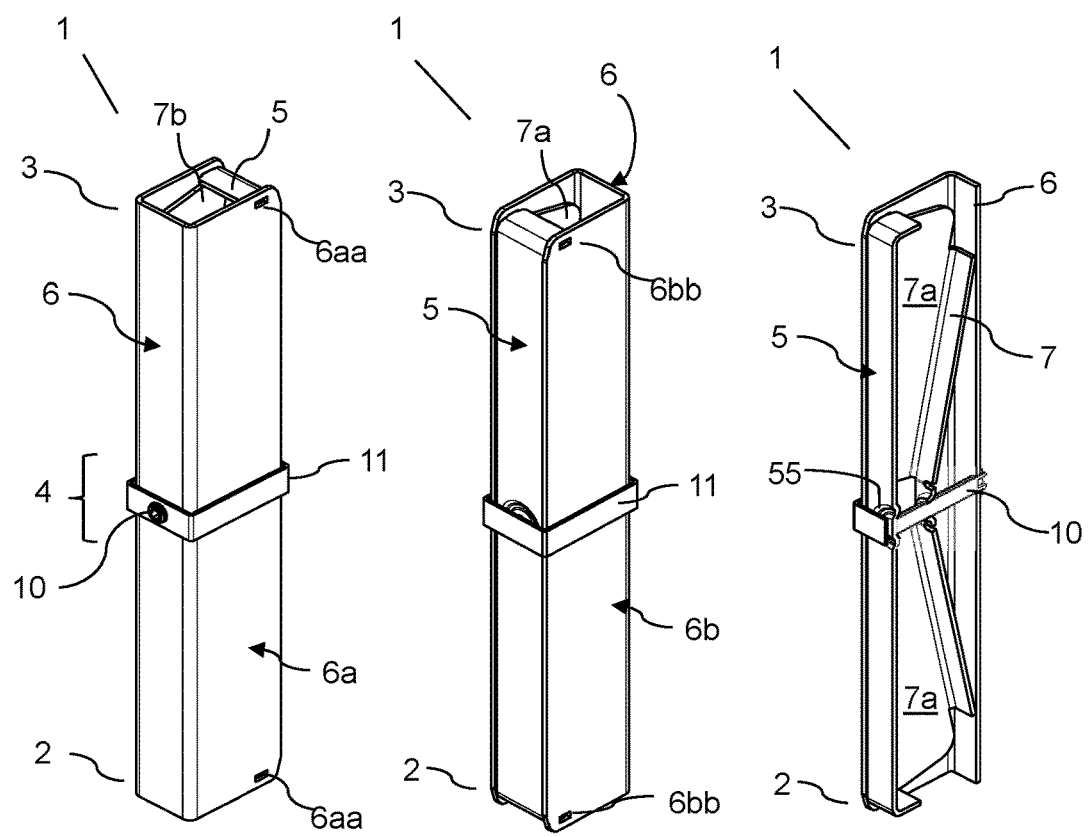
Fig. 1
Fig. 2a  Fig. 2b  Fig. 2c

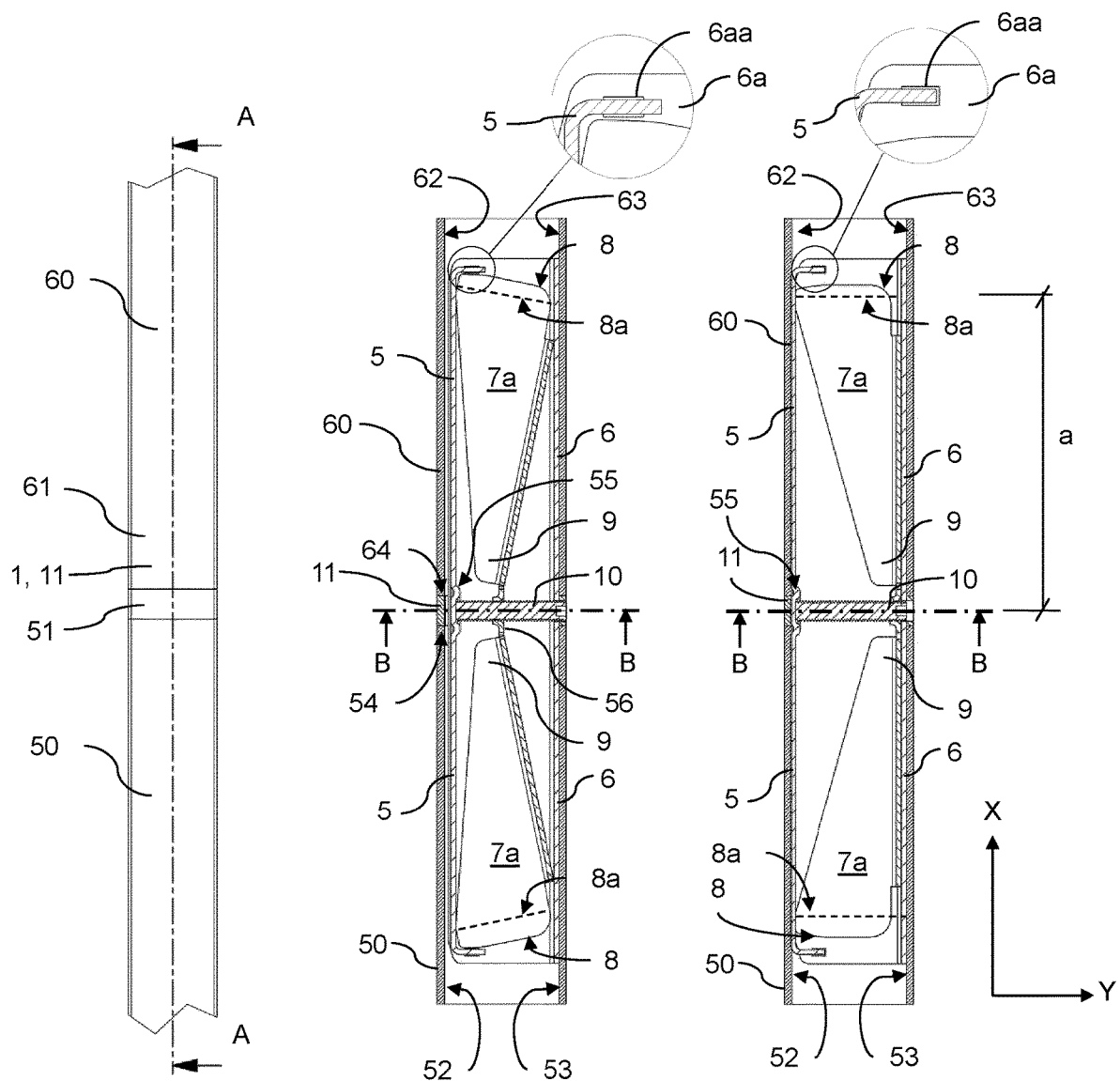
Fig. 3a    Fig. 3b (section A-A)    Fig. 3c (section A-A)
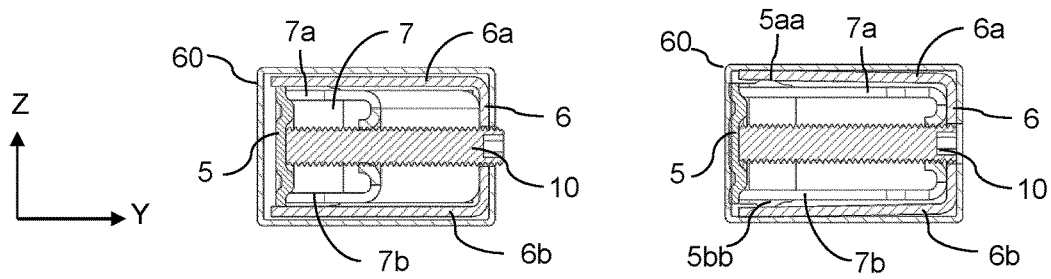
Fig. 4a (section B-B)    Fig. 4b (section B-B)

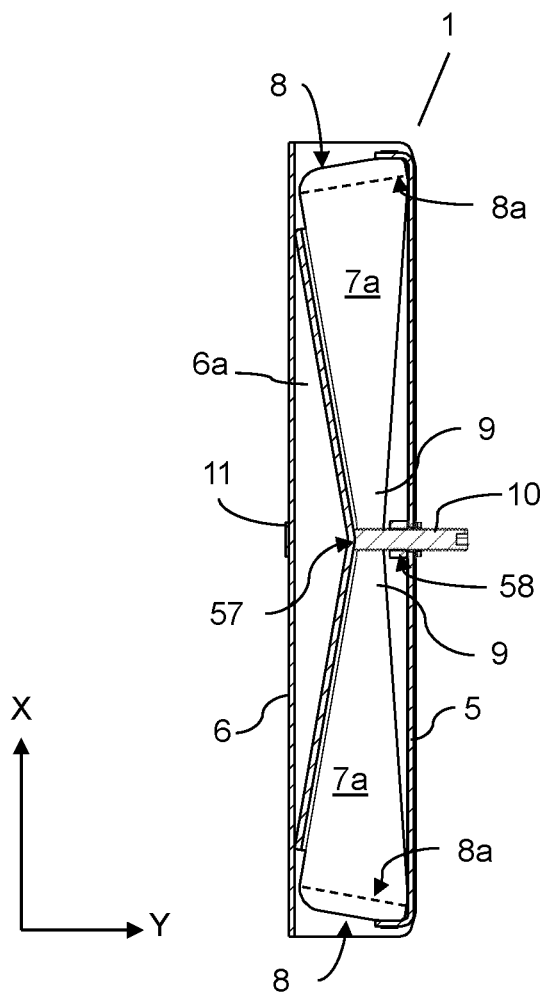
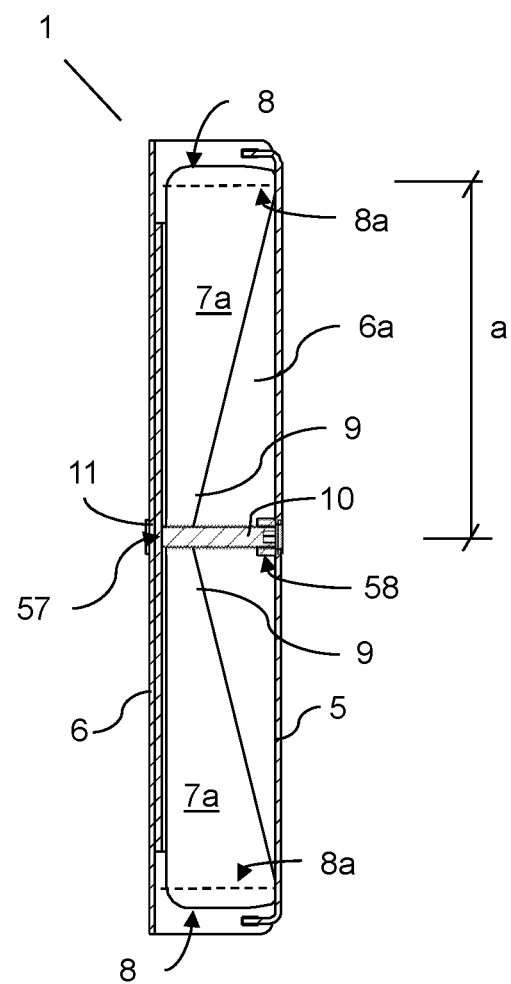
Fig. 5a
Fig. 5b
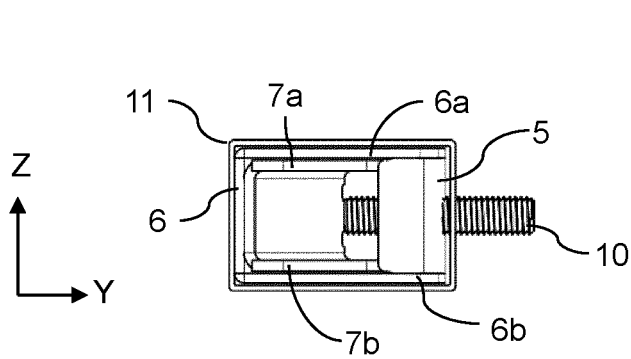
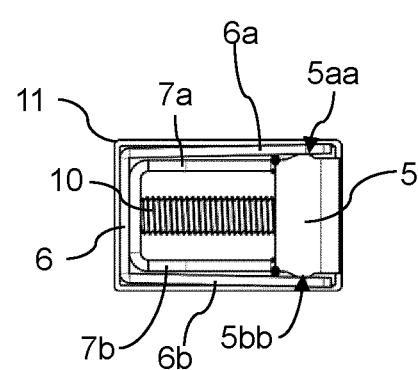
Fig. 6a
Fig. 6b

CONNECTOR AND SYSTEM FOR INTERCONNECTING TUBULAR PROFILES

TECHNICAL FIELD

The present invention relates generally to a connector and a system for interconnecting tubular profiles in their longitudinal direction, used for example to extend a tubular post. The connector is insertable in the longitudinal direction into an end of a first profile and further insertable in the longitudinal direction into an end of a second profile. Once the connector is inserted in the profile ends a substantially transversely arranged tensioner is tightened and by this single operation, the profiles are locked to each other in a very secure and quick manner. By the connector, clamping forces are achieved both at the area of the tensioner, i.e. at the respective profile ends, as well as at a distance from the tensioner, that is at a distance from the profile ends and the tensioner.

BACKGROUND ART

In the fields of machine guarding, property protection and particularly in the field of warehouse partitioning, tubular profiles are used, normally together with mesh panels or the like, to enclose machines, pallet racks, shelves etc. Especially at warehouses high profiles or posts are needed to build the partitioning "walls" around the racks and shelves. The profiles are normally tubular profiles with rectangular cross-section which are produced in certain standard lengths, for example up to 2.5 meters. Of course, tubular profiles with circular or square cross-section may also be used. Crucial for the individual profile is high impact strength and the high demands concerning the impact strength are of course also applicable on interconnected profiles with a long extension, like an extended post or the like. Known brackets or connectors for extending the tubular profiles by interconnection of the profiles are either extension brackets/connectors which encloses the outside of the profile ends or internal connectors which fit inside the ends of the tubular profiles which are to be connected. The outside brackets are normally attached to the end of a first profile and is fixed thereto by for example screws which are screwed into holes arranged in the profile or screwed to the outside of the profile. The next profile is inserted into the extension bracket and the bracket is fixed to the second profile in the same way. This type of bracket (connector) is a simple, cost-efficient and robust solution for extension of a profile but has some drawbacks. For example at the area of the bracket, it is not possible to attach other parts or brackets needed in the system, wherein for example a shelf or other part may not be positioned freely at a level without being coordinated with the level of the extension bracket/connector since it occupies the area around the ends of the interconnected profile ends. Another drawback is that the installation time is quite long since this type normally has a number of tensioners, i.e. screws which has to be tightened to make a strong and robust connection between the profiles.

From prior art it is known some internal connectors. In U.S. Pat. No. 3,547,475, a solution with an internal connector is presented. The connector is arranged for connection of rectangular tubular members (profiles/posts) which has similar cross-sections. The connector is inserted into open ends of the tubular members and by means of a screw, which is operated from the outside of the member, the corners is expanded outwardly into engagement with inner surfaces of the corresponding corners of the tubular member so that the tubular members are connected firmly together. This solution uses only one screw for connecting the tubular members, and the screw-head of the screw may be countersunk, at least partly, to not interfere with other brackets, but this solution is not that robust since the internal grip is only locally presented, with the highest expansion force at the area around the screw, which is a drawback. Another drawback is that there is tricky to align the connector with its screw-hole with the corresponding screw-hole of the tubular member, and to insert the screw into the aligned holes. It is also possible that the screw-holes has to be drilled on site, which may result in that it is even more tricky to align the connector with the screw-holes.

Another internal connector is presented in U.S. Pat. No. 5,642,957. This solution discloses a connector for tubular profiles including first and second connector elements with U-shaped cross sections and first and second jaw members. A set screw is threaded into a central portion of the second connector element between the first and second jaw members and has an end abutting with the central portion of the first connector element. A collar encircles the first and second connector elements and the set screw between the jaw members. The first and second connector elements are biased apart by an O-ring positioned between the connector elements and around the set screw. The jaw members can be inserted in longitudinal insertion directions into the tubular profiles and the set screw is threaded into the second connector element to separate the jaw members sufficiently to grip the inside surfaces of the tubular profiles with sufficient force to prevent relative movement between the jaws members and the tubular profiles. This solution provides a "flush" joint between the tubular profiles and is operated by a single screw, but it has the same drawback as the solution presented above, that the grip by the jaw members provide a good grip at the area of the screw, i.e. at the profile ends. This solution is not sufficient to provide the high impact strength which copes with the high demands according to safety standards in the field of machine guarding, property protection and warehouse partitioning.

SUMMARY OF INVENTION

An object of the present invention is to provide a quickly installed connector for interconnection of tubular profiles which connector provide high impact strength to the extended profile/post and wherein the joint has a "flush" look. The latter provides total freedom when arranging other brackets or the like along the extended profile/post and further provides a joint which is "invisible" which is of importance because many systems for machine guarding, property protection and warehouse partitioning is delivered painted, with a look adopted to a particular customer. It is also a further object to provide a system for extending tubular profiles by interconnecting the tubular profiles with the inventive connector.

According to an aspect a connector for interconnecting tubular profiles in their longitudinal direction is provided. The connector has an extension along a longitudinal first axis, an extension along a transverse second axis and an extension along a third axis, which third axis is perpendicular to the first axis and the second axis. The connector comprises a first connector end and a second connector end, which is arranged opposite the first connector end along the first axis. The connector further comprises an intermediate part which is arranged between the first and second connector ends and first and second engaging elements which have an extension along the longitudinal first axis and which are arranged opposite each other. The first engaging element is movably arranged relative the second engaging element in the transverse second axis direction, between a non-expanded state and an expanded state of the connector. At least one expansion bracket is arranged to be in contact with the first and second engaging elements, wherein the expansion bracket comprises at least one distal part arranged at a first distance from the intermediate part in the longitudinal first axis direction and at least one proximal part arranged at the intermediate part. Further, a tensioner is arranged at the intermediate part and extends substantially in the transverse second axis direction. The tensioner is engaged with the proximal part of the expansion bracket and is arranged to move the proximal part in the transverse second axis direction so that the expansion bracket pivots. When the extension brackets pivots, the at least one distal part gets an increased extension along the transverse second axis direction when the proximal part is moved in a first direction along the second axis direction thereby pressing the first and second engaging elements away from each other.

By the distal part getting an increased extension along the transverse second axis direction is meant that the distal part has an extension or a position which when the expansion bracket is pivoted from for example a first tilted position (in a non-expanded state of the connector) to a second position, (an expanded state of the connector), the first and second engaging elements are pushed apart. For example, the extension bracket may be a L-shaped bracket where "the L" is in a tilted first position in the un-expanded state of the connector, for example with the shorter "shank" of the "L" tilted relative the transverse second direction. When pivoting "the L" to the second position, the shorter shank abuts the insides of the first and second engaging elements and during the pivoting, the shank pushes the first and second engaging elements more and more apart until the distal part substantially aligns with the transverse second axis direction, and by that the distance between the first and second engaging elements increases. Another solution may be an expansion bracket in the form of an arc-shaped shank which upon pivoting from an substantially upright position, seen in the longitudinal first direction of the post/the connector, to a more tilted position, pushes the first and second engaging elements away from each other with its distal part (distal from the intermediate part). Other solutions of the expansion bracket may be at hand, for example a bracket formed like a tapered shank arranged between the first and second engaging elements with a wider distal part compared to the proximal part of the expansion bracket.

By the inventive connector, a robust and quickly installed connector for interconnecting tubular profiles is achieved. Compared to prior art, the connector is far more robust since an outwardly acting press force is achieved at the first and second engaging elements, both at the intermediate area around the tensioner as well as at a distance from the tensioner. This because that the tensioner is engaged with the proximal part of the expansion bracket and is arranged to move the proximal part in the transverse second axis direction so that the expansion bracket pivots, wherein the proximal part of the bracket pushes the first and second engaging elements away from each other at the intermediate part and the at least one distal part gets an increased extension along the transverse second axis direction thereby pressing the first and second engaging elements away from each other at a distance from the tensioner. This provides a very robust connection of the tubular profiles which results in an overall high resistance against high impact force, which is far better than prior art solutions. This together with quick assembly with one tensioner and the flush design when installed in the ends of the tubular profiles provides a very attractive and cost-efficient solution.

According to an embodiment, the distal part of the expansion bracket has a widest section which has an angle relative the transverse second axis in the non-expanded state of the connector and which widest section substantially aligns with the transverse second axis direction in the expanded state of the connector. This means that when the expansion bracket is pivoted, the widest section of the distal part pivots from an angled position which has a shorter extension in the transverse second direction, to a substantially transverse (horizontal) position in which the widest section has a longer extension in the transverse second direction, i.e. the horizontal direction, if the tubular profile is arranged in for example an upwardly extended post or the like.

According to an embodiment, the at least one expansion bracket comprises at least one shank extending in the transverse second axis direction, wherein the distal part of the shank is wider than the proximal part of the shank. The one (or several) shank provides a robust expansion bracket since a shank arranged in the transverse second direction, i.e. the expansion direction of the connector, has a very high compressive strength in its propagation direction.

According to a preferred embodiment, the at least one shank is wing-shaped and tapers from the distal part towards the proximal part of the shank. The wing-shape may of course have a number of designs, but a simple solution is a wing-shaped expansion bracket with at least one wing-shaped bracket part with a narrow proximal part and a wider distal part and extending towards the first end of the connector and preferably one mirror-copy if the wing-shaped bracket extending towards the second end of the connector. The wing-shaped bracket may comprise two parallel brackets extending from the tensioner (intermediate part) towards the first end of the connector. The wing-shaped bracket may comprise two parallel brackets extending from the tensioner (intermediate part) towards the second end of the connector. Thus, the at least one wing-shaped bracket may be individual brackets each engaged with its proximal part to the tensioner or one bracket comprising mirror-inverted wing-shaped bracket parts extending towards the first and second ends of the connector and which is engaged with the proximal part at the intermediate part of the bracket.

According to an embodiment, the second engaging element of the connector is U-shaped and comprises a first shank and a second shank both extending in direction towards the first engaging element. Further, the first shank comprises a first recess and the second shank comprises a second recess, and the first engaging element is connectable between the first and second shanks by that the first engaging element comprises a first protrusion facing the first shank and arrangeable in the first recess of the first shank and a second protrusion facing the second shank and arrangeable in the second recess of the second shank. This provides a closed "housing" in which the expansion bracket is kept between the first and second engaging elements wherein the first and second shanks of the second engaging element covers the sides of the connector. The recesses of the shanks of the second engagement element and the protrusions of the first engagement element further provides a quick assembly of the connector to one single part which may be delivered as it is, ready to be installed into ends of tubular profiles.

According to an embodiment, the respective protrusion of the first engagement element is arranged to at least partly leave the corresponding recess of the second engaging element in the transverse second axis direction, when the at least one distal part of the expansion bracket presses the first and second engaging elements away from each other, whereby the respective protrusions presses the respective first and second shanks of the second engagement element away from each other in the third axis direction. By that the respective protrusion is dimensionally coordinated with the corresponding recess, the protrusion is forced to leave the recess when the first engagement element moves away from the second engagement element upon acting the tensioner and by that the pivoting of the expansion bracket. By this, the connector expands also in the third axis direction since the protrusions "climb" up on the material of the shanks of the second engaging element, wherein a outwardly acting press force "locks" the first and second shanks of the second engagement element to the insides of the tubular profile whereby an even higher strength of the joint is achieved when the connector interconnects tubular profiles. No prior art solutions can provide this.

According to an embodiment, the connector further comprising a collar arranged at the intermediate part of the connector and which collar enclosing an outer surface of the intermediate part. Preferably an outer dimension of the collar is the same as the tubular profile in which the connector is to be installed into, whereby the outside of the collar aligns with the outside of the tubular profile and a flush look is achieved. The collar may further be arranged to hold the tensioner such as the collar comprises a through hole through which the tensioner extends and is accessible from the outside of the connector. The collar is also arranged as a stop which prevents the connector from being inserted too deep into an end of a tubular profile, since the collar is arranged at an outside of the intermediate part of the connector, i.e. enclosing the intermediate part of the connector.

According to an embodiment, the tensioner is a screw and the proximal part of the expansion bracket is engaged with the screw by a threaded engagement. The screw is preferably inserted into a through hole of at least one of the first and second engagement element and engaged by its thread to the expansion bracket. Upon turning of the screw, the proximal part of the expansion bracket moves along the screw by the thread engagement with the screw, while the screw preferably remains in the same position in relation to the first and second engagement elements. By this embodiment, the connector may be delivered in an un-expanded state with the screw entirely or almost entirely inserted into the connector, such as the screw doesn't protrude outside the connector or outside the collar, or just protrudes a minor distance outside the connector/collar. Still, the screw is engaged with the expansion bracket which is in its first position. The through holes of the first or second engagement elements and the collar provides a play around the screw such as the screw can turn without engaging with the through holes. The through holes may of course guide/slightly support the screw if wanted.

According to an alternative embodiment, the tensioner still is a screw but the proximal part of the expansion bracket is engaged with the screw by a receiving bowl arranged for receiving a screw-end of the screw. In this embodiment, the connector may be delivered in an un-expanded state with the screw protruding a bit outside the connector, such as the screw protrudes outside the connector or outside the collar. The through hole of the first or second engagement elements comprises a threaded connection to the screw and the expansion bracket is instead pushed by the screw-end in an guided manner in the receiving bowl, wherein the expansion bracket moves in the second direction which is the axial direction of the screw, from the first un-expanded state to the expanded state of the connector.

According to an embodiment, the tensioner is an excentre device comprising a pin connected to an eccentric, and the proximal part of the expansion bracket is engaged with the pin. By this, the proximal part is preferably fixedly connected to the pin, which in turn is connected to the excentre device. When operating the excentre device the pin is moved in the second direction, (transverse direction relative the first longitudinal direction) and the proximal part is thereby moved in the second direction and the expansion bracket pivots.

According to an aspect of the invention a system interconnecting tubular profiles in their longitudinal direction is disclosed. The system comprises a first tubular profile and a second tubular profile, wherein the first and second profiles extends along a longitudinal first axis. The system further comprises a connector according to any of the above described embodiments for interconnecting the first tubular profile with the second tubular profile. The connector is, in a first non-expanded state of the connector, insertable with its first connector end in the longitudinal first axis direction into an open end of the first tubular profile, and further is, in the first non-expanded state of the connector, insertable with its second connector end in the longitudinal first axis direction into an open end of the second tubular profile. When the connector is inserted into the respective open ends of the first and second tubular profiles, the connector is expandable to an expanded state such as the first and second engaging elements of the connector engages with opposite insides of the first tubular profile and with opposite insides of the second tubular profile.

Such a system provides a robust and quickly installed system for interconnecting tubular profiles, wherein for example a high (or long) tubular profile or post can be built up by individual tubular profiles, which extended tubular post or the like has a high resistance against high impact force, which is far better than prior art solutions. This since an outwardly acting press force is achieved on the insides of the tubular profiles, both at the intermediate area around the tensioner, which is near the ends of the respective tubular profile, as well as at a distance from the tensioner, which at a distance a bit away from the tubular profile ends. The distance is of course depending on the longitudinal extension of the connector. The robustness and the quick assembly of the connector into the profile ends as well as the flush design when installed in the ends of the tubular profiles provides a very attractive and cost-efficient system for extension of profiles/posts in their longitudinal direction.

According to an embodiment, the collar of the connector is arranged to abut an first edge of the open end of the first tubular profile and arranged to abut an second edge of the open end of the second tubular profile, thereby the collar is arranged as a stop while inserting the connector into the open ends of the tubular profiles. Prior art solutions of connectors in similar systems have to be thoroughly inserted into the profile ends to a precise position to align with corresponding holes for insertion of a screw alternatively do not provide that robust connection joint between the tubular profiles as the inventive system. When inserting the inventive connector into to end of the first profile, the collar provides a stop against the profile end which provides a determined position. When installed the second profile on the connector, the tensioner may be operated wherein the connector is expanded. The collar may preferably be arranged with a through hole arranged for the tensioner.

According to an embodiment, the first and second profiles has similar cross-section and the collar comprises outer dimensions corresponding to outer dimensions of the respective profiles. The collar may be the only visible part of the connector since the connector is installed inside the tubular profiles and by having corresponding outer dimensions of the collar and the profiles, the collar is only visible as a "stripe" and further extended profile/post has a flush surface. The connector may of course be arranged to fit first and second profiles with different cross-sections and the collar may be adopted accordingly or according to one of the different cross-sections of the profiles.

BRIEF DESCRIPTION OF DRAWINGS

The invention is now described, by way of example, with reference to the accompanying drawings, in which:

FIG. 1 is an isometric view of a post which is extended by interconnection of two tubular profiles by means of a connector according to the invention.

FIG. 2a-b are isometric views of a connector according to the invention from different angles and FIG. 2c is a section of the connector of FIG. 2b.

FIG. 3a is side view of the two connected tubular profiles of FIG. 1 and FIG. 3b-c are section views along section A-A of FIG. 3a in which FIG. 3b shows an un-expanded state of the connector arranged into respective ends of the tubular profiles and FIG. 3c shows an expanded state of the connector.

FIG. 4a is a section view along section B-B of FIG. 3b and FIG. 4b is a section view of along section B-B of FIG. 3c.

FIG. 5a-b are section views of an alternative connector according to the invention in which FIG. 5a shows an un-expanded state and FIG. 5b shows an expanded state of the alternative connector.

FIG. 6a is a top view of the connector of FIG. 5a and FIG. 6b is a top view of the connector of FIG. 5b.

DESCRIPTION OF EMBODIMENTS

In the following, a detailed description of a connector and a system according to the invention is disclosed in detail in respect of embodiments and in reference to the accompanying drawings. All examples herein should be seen as part of general description and therefore possible to combine in any way in general terms.

FIG. 1 shows an isometric view of a post which is extended by interconnection of two tubular profiles 50, 60 by means of a connector 1 according to the invention. To be able to extend for example a post to a certain length a system for interconnecting tubular profiles in their longitudinal direction is disclosed. A first tubular profile 50 is interconnected to a second tubular profile 60, and the first and second profiles 50, 60 extends along a longitudinal first axis X. The connector 1 for interconnecting the first tubular profile 50 with the second tubular profile 60 is only visible in the figure by that a collar 11 may be seen between the profiles 50, 60. The connector 1 is in a first non-expanded state inserted in the longitudinal first axis direction X into an open end 51 of the first tubular profile 50, and further inserted into an open end 61 of the second tubular profile 60. When this is performed the connector 1 is expanded to an expanded state which will be explained below, wherein the first tubular profile 50 is locked in a robust manner to the second tubular profile 60.

FIG. 2a-b are isometric views of the connector 1 from different angles and FIG. 2c shows a principle section of the connector of FIG. 2b. The connector 1 has an extension along the longitudinal first axis X and an extension along a transverse second axis Y. Further, the connector has an extension along a third axis Z, which is perpendicular to the first axis X and the second axis Y. The connector 1 comprises a first connector end 2 and an opposite second connector end 3 arranged along the first axis direction X. Between these ends 2, 3 is an intermediate part 4 arranged. The intermediate part 4 is in the preferred embodiment arranged in the middle of the connector, but the distance between the intermediate part 4 and the first connector end 2 may differ from the distance between the intermediate part 4 and the second connector end 3. Further, first and second engaging elements 5, 6 are arranged with an extension along the longitudinal first axis X and are arranged opposite each other with a distance in the second direction Y. The first engaging element 5 is movably arranged relative the second engaging element 6 in the transverse second axis direction Y between a non-expanded state and an expanded state of the connector 1. The second engaging element 6 preferably is U-shaped and comprises a first shank 6a and a second shank 6b both extending in direction towards the first engaging element 5. The first shank 6a comprises two first recess 6aa and the second shank 6b comprises two second recess 6bb, and the first engaging element 5 is connected by snap-connection between the first and second shanks 6a, 6b by that the first engaging element 5 comprises respective first protrusions 5aa (not visible, see FIGS. 4b and 6b) facing the first shank 6a and arrangeable in the first recess 6aa of the first shank 6a and second protrusions 5bb (not visible, see FIGS. 4b and 6b) facing the second shank 6b and arrangeable in the second recess 6bb of the second shank 6b.

To move the first engaging element 5 relative the second engaging element 6, at least one expansion bracket 7 is arranged between the engaging elements 5, 6 which may be seen in FIG. 2c. The expansion bracket 7 is arranged to be in contact with the first and second engaging elements 5, 6 on their insides. In the preferred embodiment, the expansion bracket 7 comprises a two shanks 7a, 7b which extends in the transverse second axis direction Y. The intermediate part 4 comprises a collar 11, which encloses an outer surface of the intermediate part 4 and is arranged as a stop when inserting the first connector end 2 and/or the second connector end 3 into the open end 51, 61 of the tubular profile 50, 60. The collar 11 has preferably the same outer dimensions like the first and second profiles 50, 60 such as a "flush" or smooth outside of the extended post or the like is achieved. This enables a free positioning of other brackets (if applicable) along the extended post, i.e. the connected profiles. To maneuver the expansion bracket 7 such as the first engaging element 5 moves away from the second engaging element 6, that is shifting the connector from the un-expanded state to the expanded state, a tensioner 10 in the form of a screw is arranged at the intermediate part 4. The function will be explained below.

The connector 1 may be pre-assembled to one single unit like the connector 1 visible in FIG. 2a-b, by that the expansion bracket 7 is inserted in the U-shaped second engaging element 6, then the first engaging element 5 is snapped to the second engaging element 6 such as the protrusions 5aa, 5bb snaps into the recesses 6aa, 6bb. After this, the collar 11 is mounted around the intermediate part 4 such as the collar encloses the outer surface of the intermediate part 4 and finally the screw 10 is inserted through a through hole of second engaging element 6 and the collar 11. The screw 10 is screwed into engagement with the expansion bracket 7 by a treaded engagement, and is preferably guided by a receiving part 55 of the first engaging element 5, which receiving part 55 is arranged for receiving a screw-end of the screw 10.

FIG. 3*a* shows a side view of the two connected first and second tubular profiles 50, 60 with the collar 11 of the connector 1 arranged between the ends 51, 61 of the respective profile 50, 60.

FIG. 3*b*-*c* are section views along section A-A of FIG. 3*a*. FIG. 3*b* shows the un-expanded state of the connector 1 arranged into respective ends of the tubular profiles 50, 60 and FIG. 3*c* shows the expanded state of the connector 1 mounted into the tubular profiles 50, 60. FIG. 4*a* is a section view along section B-B of FIG. 3*b* which as mentioned above shows the un-expanded state of the connector 1 and FIG. 4*b* is a section view of along section B-B of FIG. 3*c* which shows the expanded state of the connector 1. The section views are taken in the same direction as in FIG. 2*c*.

The expansion bracket 7 comprises at least one distal part 8 arranged at a first distance a from the intermediate part 4 in the longitudinal first axis direction X, and at least one proximal part 9 arranged at the intermediate part 4. The tensioner 10, which in the preferred embodiment is a screw 10, is arranged at the intermediate part 4 and extends in the transverse second axis direction Y. The screw 10 is engaged with the proximal part 9 of the expansion bracket 7 by means of a threaded engagement 56. The screw 10 is accessible from the outside by that it is protrudes a short distance outside the second engagement element 6 and the collar 11 in the un-expanded state of the connector 1. The screw 10 is rotatable around its axial direction and is guided at its end by a guiding bowl 55 arranged at the inside of the first engagement element 5. When rotating the screw 10 the proximal part 9 of the expansion bracket 7 moves along the screw 10 in the transverse second axis direction Y so that the expansion bracket 7 pivots by means of the treaded connection between the screw 10 and the expansion bracket 7, which may be seen as the shift from the un-expanded state in FIG. 3*b* to the expanded state in FIG. 3*c*. The through holes of the collar 11 and the second engagement element 6 have a diameter which is slightly larger than the diameter of the screw 10 such as forming a play around the screw 10, which means that the screw 10 is more or less in the same position referring to the second axis direction Y during the tensioning/expansion of the connector 1. The screw 10 may be screwed slightly into the connector 1 (at least a bit into the collar 11) during the last part of the expansion motion since the thread connection between the screw 10 and the bracket 7 abuts the inside of the second engagement element 6 (see for example FIG. 4*a*-*b*). When the expansion bracket 7 pivots, the at least one distal part 8 gets an increased extension along the transverse second axis direction Y so to speak, which means that a widest section 8*a* of the distal part 8 first has an angle relative the transverse second axis Y in the non-expanded state of the connector 1. Then, the widest section 8*a* substantially aligns with the transverse second axis direction Y in the expanded state of the connector 1, thereby more and more pressing the first and second engaging elements 5, 6 away from each other. This means that the first and second engaging elements 5, 6 of the connector 1 engages with opposite insides 52, 53 of the first tubular profile 50 and with opposite insides 62, 63 of the second tubular profile 60, whereby the connector 1 is robustly engaged to the profiles 50, 60, at the intermediate part 4 as well at a distance a from the intermediate part 4, that is at the distal parts 8. This results in a very robust connection between the tubular profiles 50,60. The preferred embodiment of the invention comprises as told above two shanks 7*a*, 7*b* which extends in the transverse second axis direction Y. The shanks 7*a*, 7*b* are preferably wing-shaped and tapers from the distal part 8 towards the proximal part 9 of the shank 7*a*, 7*b*. Altogether, the connector 1 is very robust and the pressing force operates at all four distal parts 8 of the expansion bracket 7.

Another "force raising" function is the snap-connection between the second engagement element 6 and the first engaging element 5. The respective protrusion 5*aa*, 5*bb* of the first engagement element 5 is arranged to at least partly leave the corresponding recess 6*aa*, 6*bb* of the second engaging element 6 in the transverse second axis direction Y, when the distal parts 8 of the expansion bracket 7 presses the first and second engaging elements 5, 6 away from each other. This may be seen in the zoomed views of FIGS. 3*b* and 3*c* together with FIGS. 4*a* and 4*b*. The respective protrusions 5*aa*, 5*bb* presses the respective first and second shanks 6*a*, 6*b* of the second engaging element 6 away from each other in the third axis direction Z, since the protrusions 5*aa*, 5*bb* are dimensionally coordinated with the corresponding recesses 6*aa*, 6*bb* which means that the protrusion 5*aa*, 5*bb* fits the recess 6*aa*, 6*bb* in the snapped position but must leave the recess 6*aa*, 6*bb* when the first engagement element 5 is pushed away from the first engagement element 6, when the expansion bracket 7 is pivoted. The expansion of the first and second shanks 6*a*, 6*b* of the second engaging element 6 away from each other results in an outward pressing force in the third axis direction Z, wherein an even higher strength of the connection between the first and second tubular profile 50, 60 is achieved.

FIG. 5*a*-*b* are section views of an alternative connector 1 according to the invention. FIG. 5*a* shows an un-expanded state of the alternative connector and FIG. 5*b* shows an expanded state of the same. FIG. 6*a* is a top view of the connector of FIG. 5*a* which as mentioned is its un-expanded state and FIG. 6*b* is a top view of the connector of FIG. 5*b* which is the expanded state. The function of the interconnection of tubular profiles is the same in this alternative solution and will not be further explained here, but the expansion bracket 7 and the tensioner 10 in the form of a screw 10 differs a bit concerning of how the screw 10 engages and moves the proximal part 9 of the expansion bracket 7. The proximal part 9 of the expansion bracket 7 is engaged with the screw 10 by a receiving part 57 which is arranged for receiving a screw-end of the screw 10. In this embodiment, the screw 10 is pre-assembled in a similar way as described above in relation to the first alternative embodiment, but in the un-expanded state of the connector 1, the screw 10 protrudes a longer distance from the collar 11/the connector 1 and the through hole may be in the mid-part of the first engagement element 5 instead of the second engagement element 6 and the through hole of the first engagement element 5 comprises a thread 58 arranged for cooperation with the thread of the screw 10. The screw end rests in the receiving part 57 and by rotating the screw 10 it is screwed inwards in direction towards the receiving part 57 of the expansion bracket 7, wherein the proximal part 9 of the expansion bracket 7 moves in the transverse second direction Y. In the same way as the first alternative embodiment, the first engagement element 5 is pushed away from the second engagement element 6 since the expansion bracket 7 pivots and by that the widest section 8*a* of the distal part 8 tilts from a angled position relative the transverse second direction Y to a at least substantially aligned position relative the transverse second direction Y. This may also be seen in FIG. 6*a*-*b*. The first engaging element 5 is snapped to the second engaging element 6 such as the protrusions 5*aa*, 5*bb* are snapped into the recesses 6*aa*, 6*bb*, similar to the embodiment of FIG. 3*a-c*, and in the same way the respective protrusion 5*aa*, 5*bb* of the first engagement element 5 is arranged to at least partly leave the corresponding recess 6*aa*, 6*bb* of the second engaging element 6 in the transverse second axis direction Y, when the distal parts 8 of the expansion bracket 7 presses the first and second engaging elements 5, 6 away from each other. The respective protrusions 5*aa*, 5*bb* presses the respective first and second shanks 6*a*, 6*b* of the second engaging element 6 away from each other in the third axis direction Z which results in an outward pressing force in the third axis direction Z.

Other alternative solutions for using the inventive way of interconnecting tubular profiles may be for example that the tensioner 10 may be an excentre device comprising a pin connected to an eccentric, and the proximal part 9 of the expansion bracket 7 is engaged with the pin, or that the bracket 7 may be one or more preferred two arc-shaped brackets where one end of the arc abuts the inside of the first and second engaging element 5, 6 at the first and second connector ends 2, 3 and the mid-point of the arc-shaped bracket 7 may be arranged at the intermediate part 4. A respective pivot point may be arranged between the intermediate part 4 and the respective connector ends 2, 3 and the brackets 7 may be engaged with the pivots and by pushing the arc-shaped brackets 7 away or towards each other, the brackets 7 will pivot and the arc-ends will push the first and second engaging element 5, 6 away from each other.

The invention claimed is:

1. A connector for interconnecting tubular profiles in their longitudinal direction, the connector having an extension along a longitudinal first axis, an extension along a transverse second axis and an extension along a third axis, which third axis is perpendicular to the first axis and the second axis, the connector comprising:
   a first connector end,
   a second connector end arranged opposite the first connector end along the first axis,
   an intermediate part arranged between the first and second connector ends,
   first and second engaging elements having an extension along the longitudinal first axis and arranged opposite each other, wherein the first engaging element is movably arranged relative the second engaging element in the transverse second axis direction between a non-expanded state and an expanded state of the connector,
   at least one expansion bracket arranged to be in contact with the first and second engaging elements, wherein the expansion bracket comprises at least one distal part arranged at a first distance from the intermediate part in the longitudinal first axis direction and at least one proximal part arranged at the intermediate part,
   a tensioner arranged at the intermediate part and substantially extending in the transverse second axis direction, which tensioner is engaged with the proximal part of the expansion bracket and arranged to move the proximal part in the transverse second axis direction so that the expansion bracket pivots, and the at least one distal part gets an increased extension along the transverse second axis direction when the proximal part is moved in a first direction along the second axis direction to press the first and second engaging elements away from each other,
   wherein the second engaging element of the connector is U-shaped and comprises a first shank and a second shank both extending in direction towards the first engaging element, the first shank comprises at least a first recess and the second shank comprises at least a second recess, and the first engaging element is connectable between the first and second shanks by that the first engaging element comprises a first protrusion facing the first shank and arrangeable in the first recess of the first shank and a second protrusion facing the second shank and arrangeable in the second recess of the second shank, wherein the respective protrusion of the first engagement element is arranged to at least partly leave the corresponding recess of the second engaging element in the transverse second axis direction when the at least one distal part of the expansion bracket presses the first and second engaging elements away from each other, and the respective protrusions presses the respective first and second shanks of the second engaging element away from each other in the third axis direction,
   wherein the distal part of the expansion bracket has a widest section which has an angle relative the transverse second axis in the non-expanded state of the connector and which widest section substantially aligns with the transverse second axis direction in the expanded state of the connector, and
   wherein the tensioner is a screw and the proximal part of the expansion bracket is engaged with the screw by a threaded engagement.

2. The connector according to claim 1, wherein the at least one expansion bracket comprises at least one shank extending in the transverse second axis direction, wherein the distal part of the shank is wider than the proximal part of the shank.

3. The connector according to claim 2, wherein the at least one shank is wing-shaped and tapers from the distal part towards the proximal part of the shank.

4. The connector according to claim 1, wherein the connector further comprising a collar arranged at the intermediate part of the connector and which collar enclosing an outer surface of the intermediate part.

5. A system for interconnecting tubular profiles in their longitudinal direction, the system comprising:
   a first tubular profile,
   a second tubular profile, wherein the first and second profiles extends along a longitudinal first axis,
   a connector according to claim 1 for interconnecting the first tubular profile with the second tubular profile,
   wherein the connector in a first non-expanded state of the connector is insertable with its first connector end in the longitudinal first axis direction into an open end of the first tubular profile, and further in the first non-expanded state of the connector is insertable with its second connector end in the longitudinal first axis direction into an open end of the second tubular profile, and wherein when the connector is inserted into the respective open ends of the first and second tubular profiles the connector is expandable to an expanded state such as the first and second engaging elements of the connector engages with opposite insides of the first tubular profile and with opposite insides of the second tubular profile.

6. The system according to claim 5, wherein a collar of the connector is arranged to abut an first edge of the open end of the first tubular profile and arranged to abut an second edge of the open end of the second tubular profile, and the collar is arranged as a stop while inserting the connector into the open ends of the tubular profiles.

7. The system according to claim 6, wherein the first and second profiles have a similar cross-section, and the collar comprises outer dimensions corresponding to outer dimensions of the respective profiles.

\* \* \* \* \*